United States Patent [19]

Wada et al.

[11] 4,149,196

[45] Apr. 10, 1979

[54] FACSIMILE TRANSMITTER RECEIVER SYSTEM

[75] Inventors: Tasaku Wada, Tokyo; Ren Aoki; Mitsugu Fujiwara, both of Hanamaki, all of Japan

[73] Assignees: Kokusai Denshin Denwa Co., Ltd., Tokyo; Yamura Shinko Seisakusho Co., Ltd., Iwate, both of Japan

[21] Appl. No.: 791,325

[22] Filed: Apr. 27, 1977

[30] Foreign Application Priority Data

Apr. 28, 1976 [JP] Japan .................................. 51-49049
Apr. 28, 1976 [JP] Japan .................................. 51-49050

[51] Int. Cl.[2] .......................... H04N 1/10; H04N 1/22; H04N 1/42
[52] U.S. Cl. ..................................... 358/286; 358/293
[58] Field of Search ................ 358/285, 286, 257, 293

[56] References Cited

U.S. PATENT DOCUMENTS

| | | | |
|---|---|---|---|
| 3,445,587 | 5/1969 | Jansen et al. ........................... | 358/257 |
| 3,445,598 | 5/1969 | Green et al. ........................... | 358/286 |
| 3,448,207 | 6/1969 | Green et al. ........................... | 358/293 |
| 3,598,910 | 8/1971 | Johnston et al. ....................... | 358/286 |
| 3,652,793 | 3/1972 | Farr et al. ............................... | 358/286 |
| 3,818,126 | 6/1974 | Fomenko et al. ...................... | 358/286 |
| 3,845,239 | 10/1974 | Granzow et al. ...................... | 358/286 |

*Primary Examiner*—Robert L. Griffin
*Assistant Examiner*—Joseph A. Orsino, Jr.
*Attorney, Agent, or Firm*—Armstrong, Nikaido, Marmelstein & Kubovcik

[57] ABSTRACT

A facsimile transmitter receiver system comprising a carrier having a read head and a write head movable linearly in both directions by a pulse motor for main scanning of a printing paper and an original paper, a control circuit for applying a predetermined number of pulses to said pulse motor for each main scanning cycle. A synchronization signal is generated in each scanning cycle in both the directions in the transmission mode, and said synchronization signal received by the corresponding facsimile system in the receiving mode initiates the operation of said control circuit, thus the facsimile systems in communication are synchronized to each other.

4 Claims, 6 Drawing Figures

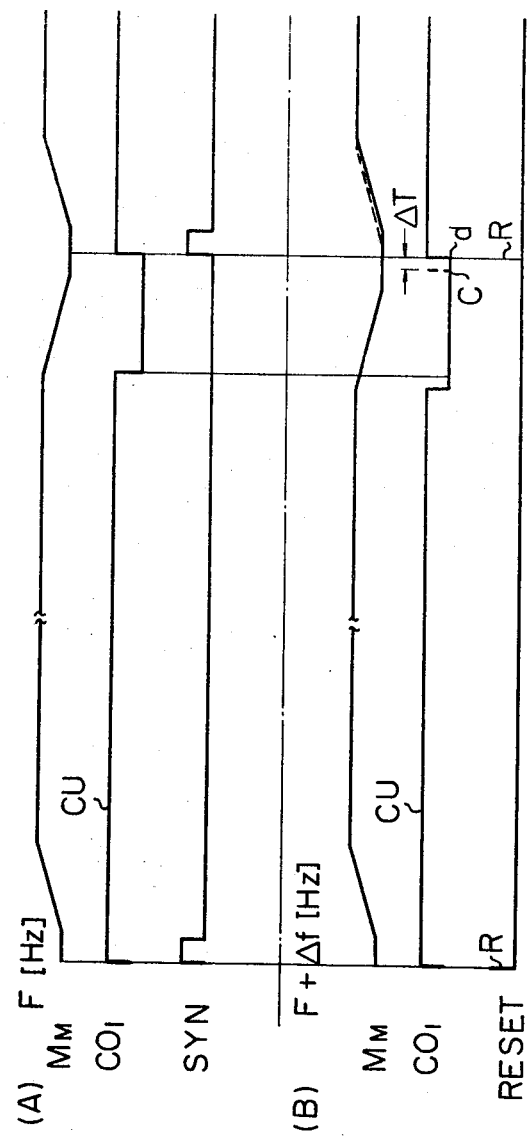

FACSIMILE TRANSMITTER RECEIVER SYSTEM

BACKGROUND OF THE INVENTION

The present invention relates to a facsimile transmitter-receiver for plane scanning, and especially relates to a facsimile device which scans in both directions.

Conventional plane scanning facsimile devices mainly have mechanical or electrical scanning mechanisms. Prior mechanical type of facsimile systems use a synchronous motor as the drive source to move the head or optical system etc., for scanning, but they have the disadvantages that it takes a long time to establish rotation synchronization and/or phase synchronization, that the occurrence of synchronization errors is high, and that the structure is complicated and the manufacturing costs are high. Accordingly the prior mechanical type scanning device can not be used for a dual-direction type scanning device. On the other hand, prior electronic type of facsimile systems use electronic tubes, solid scanning elements, etc., for electrical scanning, so that synchronization is easy and the device can be made small in size, but extremely high manufacturing costs are a disadvantage.

SUMMARY OF THE INVENTION

It is an object, therefore, of the present invention to overcome the disadvantages and the limitations of prior facsimile systems by providing a new and improved facsimile system.

According to the present invention, the facsimile transmitter-receiver system comprises a carrier having a read head and a write head movable linearly in both directions by a pulse motor for main scanning of a printing paper and an original paper, a control circuit for applying a predetermined number of pulses to said pulse motor for each scanning cycle and sending a synchronization signal at the beginning of each scanning cycle in the transmission mode and said control circuit is set into operation by the received synchronization signal, means for moving said printing paper and an original paper by a predetermined length at the end of each scanning cycle, and means for changing the operational mode of the device between either local mode, transmission mode and receiving mode.

BRIEF DESCRIPTION OF THE DRAWINGS

The foregoing and other objects, features, and attendant advantages of the present invention will be appreciated as the same become better understood by means of the following description and accompanying drawings wherein;

FIGS. 4, 5 and 6 are explanatory drawings for the explanation of the operation of the facsimile system according to the present invention.

DESCRIPTION OF THE PREFERRED EMBODIMENTS

Figure 1:
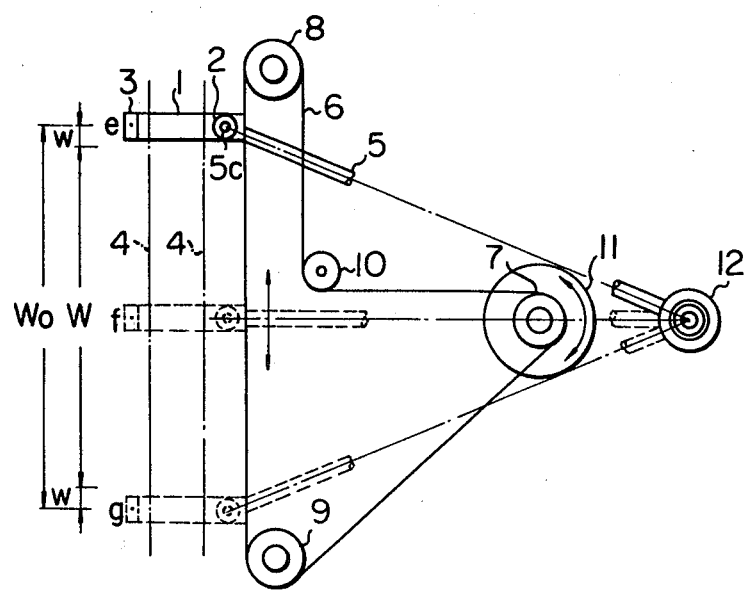
FIG. 1 is a plane view of the scanning unit of the facsimile system according to the present invention.

FIG. 1 is the plane view of the scanning unit of the facsimile system according to the present invention.

One end of the carrier 1 is fixed to the belt 6, and guided by a pair of rails 4, said carrier 1 executes linear movement from position (e) via position (f) to position (g) over the distance $W_O$ and back. The read-head 5c and the write head 3 are fixed on this carrier 1. During the movement of the carrier 1, the read-head 5c and/or the write-head 3 scan the effective width W of the original paper and/or the recording paper respectively at a constant speed in both directions, from (e) to (g) and from (g) to (e). The length w on both sides of the effective width W is the range for acceleration and deceleration of the carrier 1, and $w = \frac{1}{2}(W_O - W)$ applies to this area. The belt 6 is held under tension by the pulleys 7, 8, 9 and 10 and according to the alternating forward and backward rotation of the main scanning drive pulse motor 11, alternating drive of the carrier 1 in both directions over the distance $W_O$ is accomplished. The optical fiber assembly 5 (refer to FIG. 2), one end of which is the read-head 5c, is held at both the ends by the bearings 2 and 12 (refer to FIG. 2), so that movement of the carrier 1 does not cause excessive strain.

Figure 2:
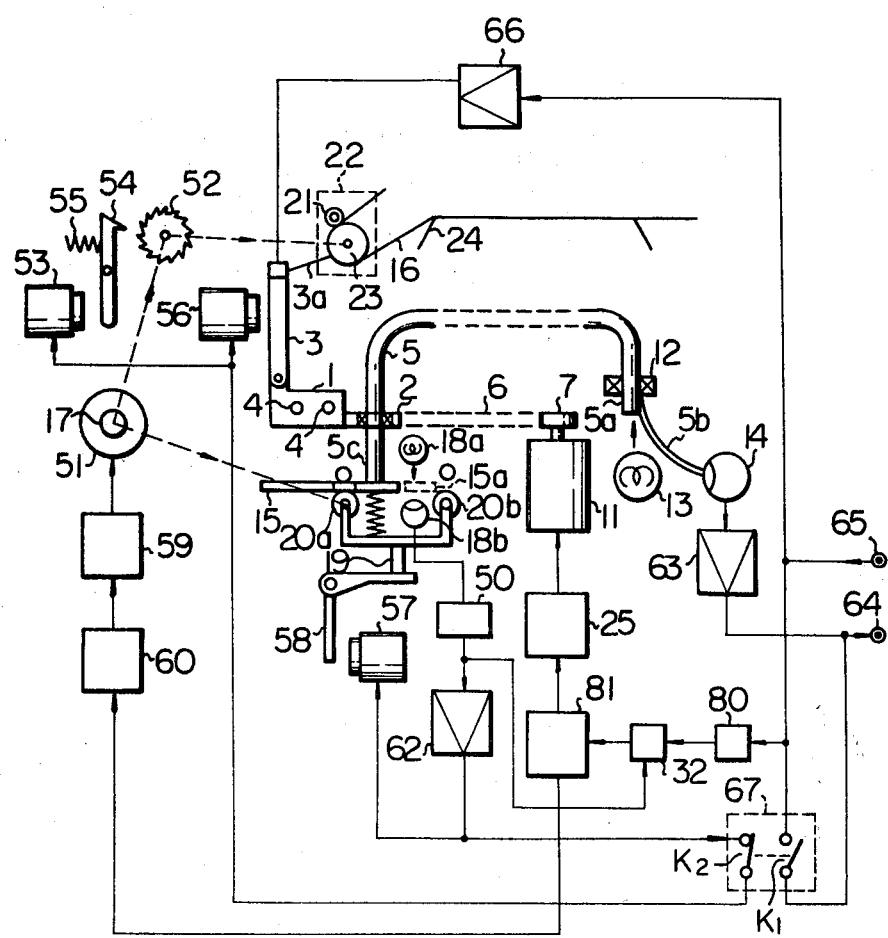
FIG. 2 is the block diagram showing the mechanical structure of the facsimile system according to the present invention.

FIG. 2 is the block diagram showing the mechanical structure of the facsimile system according to the present invention.

As already explained above, the read-head 5c at the end of the optical fiber assembly 5, supported by the bearing 2, and the write head 3 are fixed on the carrier 1. This carrier 1 is driven by the belt 6 via the pulley 7 connected to the main scanning pulse motor 11, and it moves linearly on the rails 4. Original paper 15 and printing paper 16 are fed by the auxiliary scanning pulse motor 51 via the pulley 17, via wheels 20a and 20b of the original feed part, and via ratchet gear 52, roller 21, and platen 23 of the printing paper feed part, respectively. Electromagnets 53, 56, and 57 are installed for controlling the movement of the printing paper and the original paper, and the operation of the write head. The change-over switch 67 is installed for switching between the LOCAL mode, where operation occurs only within the facsimile device, and the COMMUNICATION mode, where transmission to or reception from other facsimile devices is executed.

This facsimile device normally is in the receiving mode in the communication mode. When a synchronization signal is applied at the input terminal 65 (see FIG. 2), the main scanning pulse motor 11 is driven via the detector 80 consisting of start signal detector 69 and completion signal detector 70, the control circuit 81 consisting of flip-flop 32, counter 38, clock generator 39, etc, and the drive circuit 25, thus the main scanning operation is started. The picture signal, following the synchronization signal goes through the amplifier 66 to the write pen 3a of the write-head 3. The write-head 3 operates on the principle of electrical discharge printing. When one main scanning is completed, a signal is sent out from the control circuit 81 through the frequency division circuit 60 and the drive circuit 59, to the auxiliary scanning pulse motor 51 for step-feed of the printing paper 16 as described above. 24 is the guide plate for the printing paper 16.

In order to set this facsimile transmitter-receiver into the transmission mode, it is sufficient to insert the original paper 15. When the original paper 15 is inserted to the position 15a, the detection device consisting of the light source 18a and the light detection element 18b operates; the resultant signal goes through inverter 50, flip-flop 32, control circuit 81, and drive circuit 25, and drives the main scanning pulse motor 11 for execution of main scanning. The above signal also drives the electromagnet 57 via inverter 50 and amplifier 62, then the lever 58 is attracted, the original feed part 19 lifts the original feed wheels 20a and 20b against the spring, then the original paper is clamped between said wheels 20a and 20b and their corresponding rollers, thus reading of the original paper 15 and auxiliary scanning become possible. The above signal further drives the electromagnet 53 via the contact $K_2$ of the switch 67, then the ratchet lever 54 is operated, and the ratchet gear 52 is locked, thus the feed of the printing paper 16 is stopped. The drive of the electromagnet 56 causes attraction of the write-head 3, and by separation of the write pen 3a from the printing paper 16, the printing operation is stopped. The picture information from the original paper 15 passes through read-head 5c, optical fiber assembly 5, one end of the reception fiber 5b to the light detector element 14, and is converted to a picture signal, then transmitted from the output terminal 64 via the amplifier 63. The optical fiber assembly 5 consists of the emission fiber 5a and the receiving fiber 5b for transmission of picture information. The light from the light source 13 passes through the emission fiber 5a to the original paper 16.

When the change-over switch 67 is set to the LOCAL mode, the contact $K_2$ opens and the contact $K_1$ closes. Accordingly, the input terminal 65 and the output terminal 64 are short-circuited (see FIG. 2), the electromagnet 56 is de-energized, the write-head 3 is pushed by the force of the spring (not indicated in the drawing), and the write pen 3a comes into contact with the printing paper 16. De-energizing the electromagnet 53 further causes the ratchet lever 54 to be pushed back by the force of the spring 55, the ratchet gear 52 is released, and the feed of the printing paper becomes possible. The picture signal from the read-head 5c is sent to the write pen 3a of the write-head 3 via amplifiers 63 and 66 and contact $K_1$, thus the reading and writing operation only within the facsimile device is executed. In this case the synchronization operation for reading and writing is exactly the same as will be explained in the following for the COMMUNICATION mode.

Figure 3:
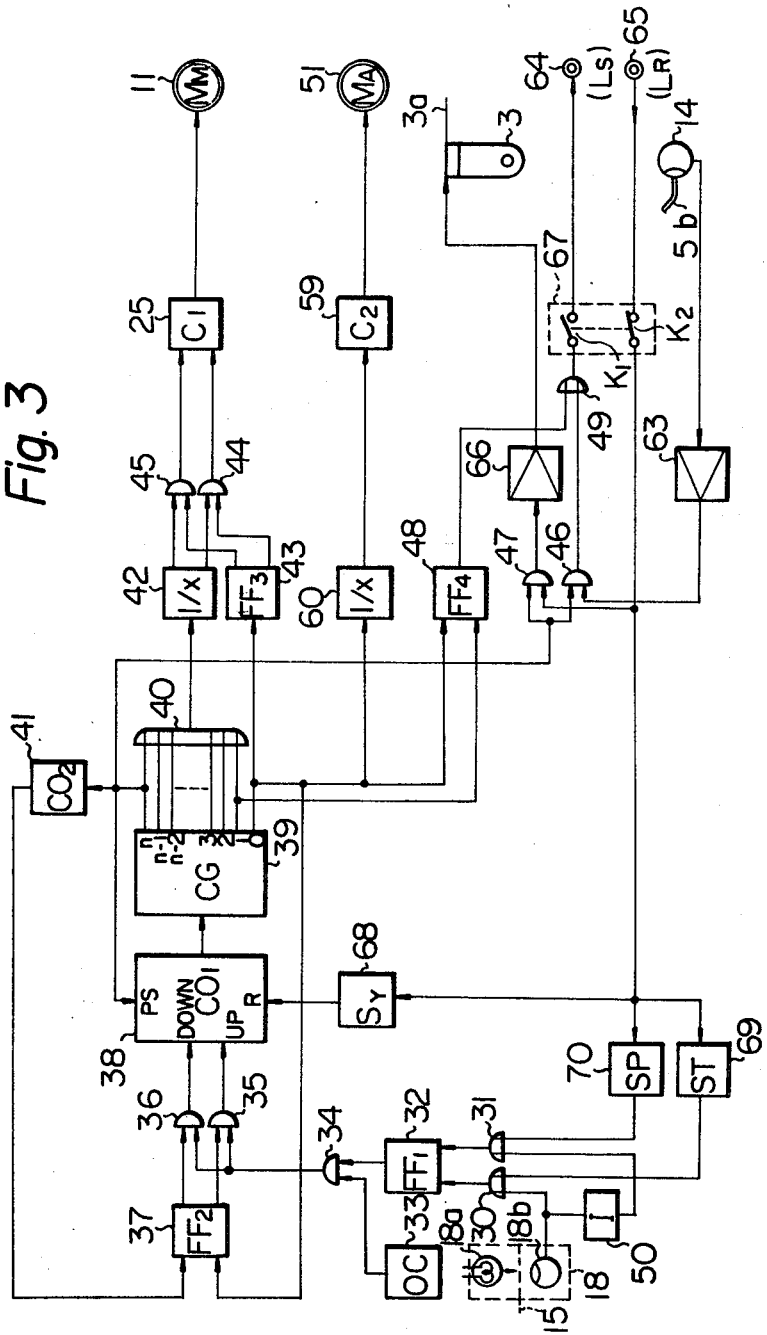
FIG. 3 is the block diagram of a control circuit in the facsimile system according to the present invention.
Figure 4:
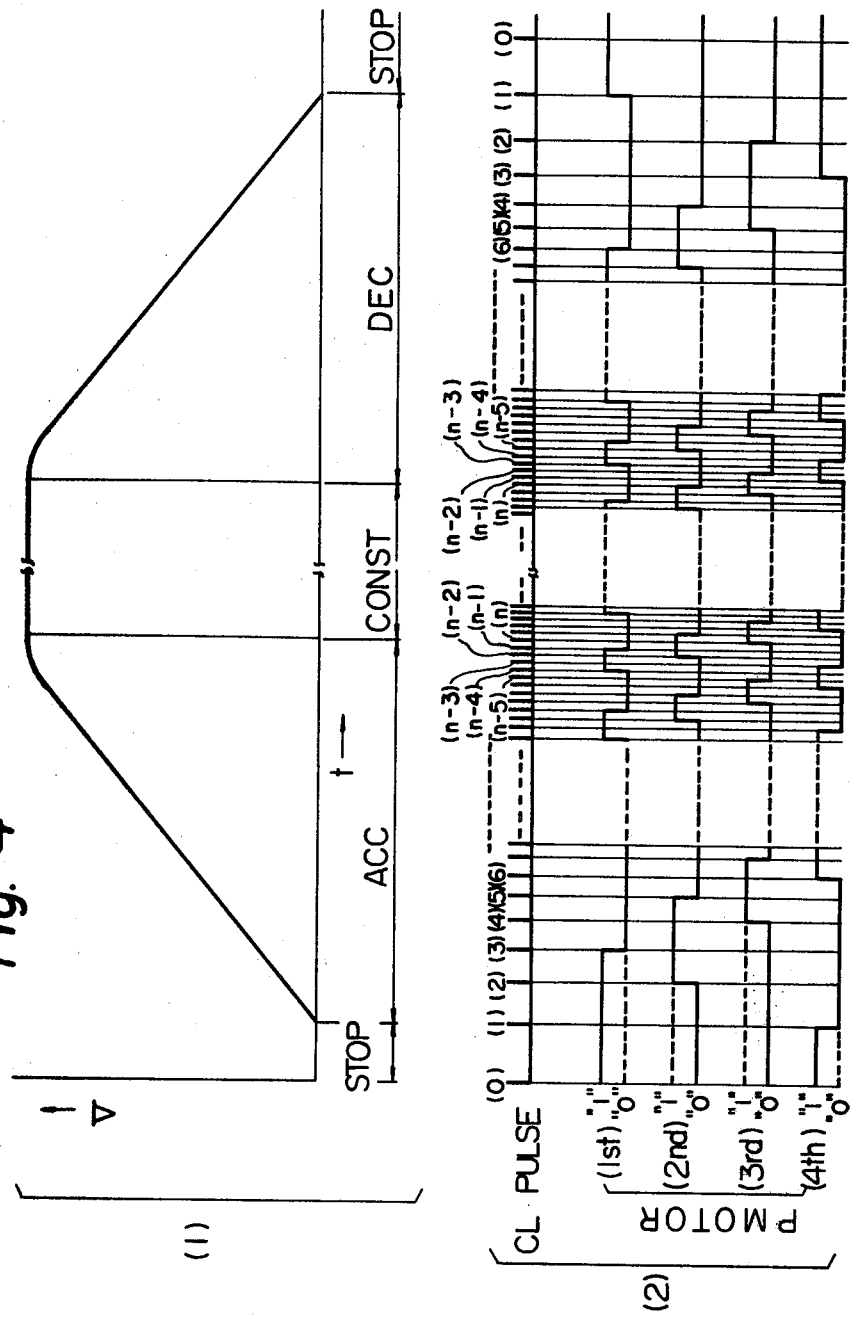
Figure 5:
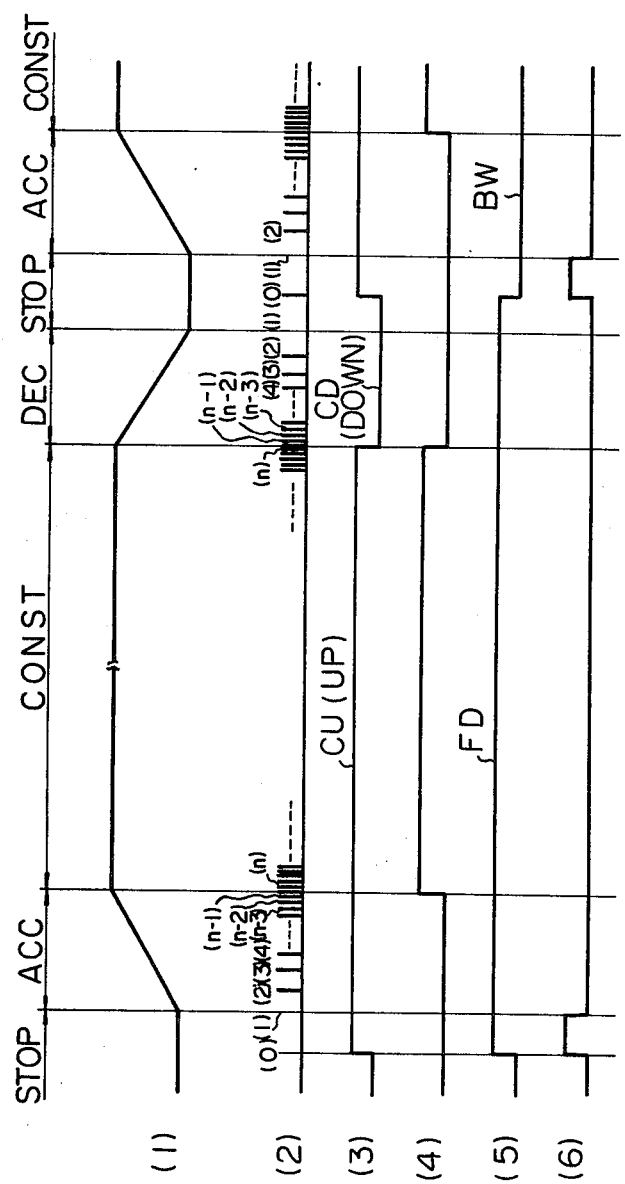

FIG. 3 is the block diagram of the control circuit of the present facsimile system, and FIG. 4 is the time chart showing the operation of the pulse motor 11 for main scanning drive. FIG. 5 is the operational wavefarm of the control circuit of FIG. 3. First, the electrical operation of the present facsimile system will be explained in detail according to FIG. 3. The start of the transmission operation is effected by insertion of the original paper 15, by which the detection device 18 consisting of light source 18a and light detection element 18b, operates; the flip-flop 32 is set via the OR-gate 30. While the receiving operation is started by reception of the synchronization signal at the input terminal 65, which is detected by the start signal detector 69, thus setting the flip-flop 32 via the OR-gate 30. The completion of the transmission operation is detected by the end of the original paper 15 by the detection device 18 and the flip-flop 32 is reset to zero via the inverter 50 and the OR-gate 31. The completion of the reception operation is effected by detection of the completion signal at the input terminal 65 by the completion signal detector 70 and the flip-flop 32 is reset to zero via the OR-gate 31. The circuit operation after the flip-flop 32 is the same for transmission and reception, and shall be explained in the following. The output of the flip-flop 32 opens the AND-gate 34, thus the pulse signal from the oscillator 33 is applied to the AND-gate 35 and the AND-gate 36 through the AND-gate 34. Since the flip-flop 37 opens the AND-gate 35, the above pulse signal from the oscillator 33 enters the UP terminal of the counter 38 to operate the same. The output of this counter 38 is sent to the main scanning pulse motor 11 through the clock oscillator 39, OR-gate 40, frequency divider 42, flip-flop 43, AND-gates 44 and 45, and drive circuit 25, thus the pulse motor 11 is started. This embodiment uses a 4 phase pulse motor 11 with the 1 or 2 phase excitation method, and in the following, the operation of this pulse motor is explained by means of FIG. 3 and FIG. 4.

As shown in FIG. 4, this pulse motor 11 is in stop condition during the clock pulse (CL Pulse) (0)–(1), and the excitation signals of the first phase and the fourth phase are "1," that is to say, those two phase of the exciting coils are energized. With the input of the clock pulse (1), only the first phase remains excited and the fourth phase is de-energized thus the pulse motor 11 starts. With the input of clock pulse (2), the first phase and second phase are excited, and with following input of clock pulse (3), only the second phase is excited, and by input of the following clock pulses, the second phase and third phase, third phase only, third phase and fourth phase, fourth phase only, fourth phase and first phase, etc. are excited in sequence, and this pulse motor 11 is accelerated in this way. In this case, the intervals between the clock pulses (0), (1), (2), ... (n − 2), (n − 1) is designed to obtain smooth acceleration from the stop condition when the pulse motor 11 has a cycloid characteristic, and this interval setting is executed by the clock oscillator 39. When the clock pulses from the clock oscillator 39 reach the (n)th pulse, the preset signal is sent to the counter 38, and the clock pulse (n) from the clock oscillator 39 is continued as output for constant speed of the pulse motor 11. Simultaneously the counter 41 starts operation and counts the number of the clock pulses (n). When the clock pulses (n) reach a predetermined number, the flip-flop 37 is reversed by the output from the counter 41, and the pulse signal from the oscillator 33 goes via the AND-gate 36 to the DOWN terminal of the counter 38. This effects output of clock pulses (n), (n − 1), (n − 2), ... (2), (1) from the clock oscillator 39, so that the pulse motor 11 receives phase excitation as shown in the deceleration range (DEC) of FIG. 4 and executes the deceleration operation. In this way the pulse motor 11 executes the stop, acceleration (ACC), constant speed operation (CONST), deceleration (DEC), and stop sequence as shown in the velocity curve (1) in FIG. 4. And the coupled carrier 1 (FIG. 1) executes a single-way scanning. With following output of the clock pulse (0) by the clock oscillator 39, the flip-flop 43 is reversed, the pulse motor 11 starts reverse rotation, and a single return scanning is executed in the reverse direction by the above sequence. The output of the clock oscillator 39 is sent to the forward or reverse terminal of the drive circuit 25 via or OR-gate 40, frequency divider 42, and the AND-gate 44 or 45.

Next, the control operation of the present invention will be explained in detail according to FIGS. 3 and 5. In FIG. 5, the curve (1) shows the speed of the pulse motor 11, the curve (2) shows the clock pulse, the curve (3) shows the output of the flip-flop ($FF_2$) 37, the curve (4) shows the output of the counter ($CO_2$) 41, the curve (5) shows the output of the flop-flop ($FF_3$) 43, and the curve (6) shows the output of the flip-flop ($FF_4$) 48. As shown in FIG. 5, with the facsimile device in the stop region, the clock pulse (0) reverses the flip-flop 43 (FF$_3$), which changes the direction of the rotation of the pulse motor 11 from forward rotation (FD) to reverse rotation (BW) and vice versa. At the same time the switching to the count-up (CU) mode of the counter 38 is executed by reversion of the flip-flop 37 (FF$_2$). During the clock pulse (0)–(1), the flip-flop 48 (FF$_4$) is ON, and its output is transmitted via OR-gate 49 and the output terminal 64 as a synchronization signal to another facsimile device which is in receiving mode. As the reception side, this synchronization signal is detected by the synchronization signal detector 68, and the counter 38 is reset to zero, thus the count-up start point of the counter 38 is compulsorily synchronized. For the clock pulses (1)–(n), the carrier 1 (FIG. 1) is accelerated as described above. When the number of clock pulse reaches (n), the carrier 1 reaches constant speed, the counter 41 (CO$_2$) starts to count the number of clock pulses (n), and the AND-gate 46 or 47 opens to start the reading or writing operation. Reading operation is executed by the receiving fiber 5b and the light detection element 14. The picture signal thus obtained passes through the amplifier 63, the AND-gate 46, and the OR-gate 49, and is transmitted from the output terminal 64 to another facsimile device. With input of the picture signal at the input terminal 65 of the reception side, this picture signal is sent to the write pen 3a of the write-head 3 via contact K$_2$ of the change-over switch 67, AND-gate 47, and amplifier 66, thus the writing operation is executed. When the counted value of the counter 41 (CO$_2$) reaches the predetermined number, e.g. when the carrier 1 has reached the end of the constant speed range (W of FIG. 1) for one scanning of original or printing paper, the output from this counter reverses the flip-flop 37 (FF$_2$) to execute the change-over to count-down of the counter 38, and as already explained above, the carrier 1 decelerates during the clock pulses (n)–(1). When clock pulse (0) appears flip-flop 43 (FF$_3$) and flip-flop 37 (FF$_2$) are reversed again, and the scanning is executed again but in the opposite direction, while at the same time the signal is sent to the pulse motor 51 via the frequency divider 60 and the drive circuit 57 to execute original or printing paper movement, e.g. auxiliary scanning. Further, the flip-flop 48 is reversed and transmission of the synchronization signal at the start of the next scanning is prepared. Thus, the operation of the receiving facsimile is synchronized with that of the transmission facsimile every time the scanning cycle starts either from left to right or from right to left.

FIG. 6 explains the synchronization operation of the present invention, with (A) indicating the operation of the transmission side and (B) indicating the operation of the reception side. With F being the clock frequency of the oscillator 33 of the transmission side, and F + Δf being the clock frequency of the oscillator 33 on the reception side, generally the count operation of the counter 38 (CO$_1$) on the reception side will precede the count operation on the transmission side, and the clock frequency difference would show directly the count difference ΔT (e.g. the synchronization difference). However, with the present invention the synchronization signal detector 68 (FIG. 2) of the reception side detects the transmission synchronization signal (SYN) and executes the compulsory resetting of the counter 38 by the reset pulse (R) every time the carrier 1 starts either from left to right or from right to left, so that the count-up (CU) start on the reception side is shifted from point (c) to point (d), in FIG. 6. Accordingly, the operation of the reception side is synchronized to the operation of the transmission side, by coinciding the start point of the counter (CO$_2$) in the receiving station with that in the transmission station.

When, on the other hand, the clock frequency on the transmission side is F + Δf, and the clock frequency on the transmission side is F + Δf, and the clock frequency on the reception side is F, it is clear, that the same synchronization operation will be executed. In this way, this invention cancels synchronization errors by sending synchronization signals (SYN) from the transmission station to reception station for each scanning, so that even in case of use of low class oscillator 33, there will be absolutely no synchronization error by the accumulation of synchronization deviation. As explained in the above, the facsimile transmitter-receiver according to this invention is composed of a very simple mechanical structure and control circuit and uses a rational synchronization method, so that smaller size and lower costs can be realized with the further advantages of accurate synchronization, extremely easy operation, low power consumption, etc. Accordingly, the device according to this invention is very beneficial.

From the foregoing it will now be apparent that a new and improved facsimile system has been found. It should be understood of course that the embodiment disclosed is merely illustrative and is not intended to limit the scope of the invention. Reference should be made to the appended claims, therefore, rather than the specification as an indication of the scope of the invention.

Finally, the reference numerals referred to in the specification are listed below.

---

1 ... Carrier, 2, 12 ... Bearing,
3 ... Write-head, 3a ... Write pen,
4 ... Rail, 5 ... Optical fiber assemble,
5a ... Emission fiber, 5a ... Reception fiber,
5c ... Read-head, 6 ... Belt,
7, 8, 9, 10, 17 ... Pulley,
11, 51 ... Pulse motor, 13, 18a ... Light source,
14, 18b ... Light detection element,
15, 15a ... Original, 16 ... Printing paper,
18 ... Detector, 19 ... Original feed part,
20a, 20b ... Wheel, 21 ... Roller,
22 ... Printing paper feed part, 23 ... Platen,
24 ... Guide plate, 25, 59 ... Drive circuit,
30, 31, 40, 49 ... OR-gate,
34 – 36, 44 – 47 ... AND-gate,
32, 37, 43, 48 ... Flip-flop, 33 ... Oscillator,
38, 41 ... Counter, 39 ... Clock oscillator,
42, 60 ... Frequency divider, 50 ... Inverter,
52 ... Ratchet gear, 53, 56, 57 ... Electromagnet,
54 ... Ratchet lever, 55 ... Spring,
58 ... Lever, 62, 63, 66 ... Amplifier,
64 ... Output terminal, 65 ... Input terminal,
67 ... Change-over switch,
68 ... Synchronization signal detector,
69 ... Start signal detector,
70 ... Completion signal detector,
80 ... Detector, 81 ... Control circuit.

---

What is claimed is:

1. A facsimile transmitter-receiver system comprising: a pulse motor, a carrier operably connected to the pulse motor having a read head and a write head movable linearly in both directions by the pulse motor for scanning a printing paper and an original paper, the speed of movement of the carrier in one direction being the same as that in the other direction, means for mounting an original paper in front of the read head, means for mounting a printing paper in contact with the write head, a control circuit coupled to the pulse motor for applying a predetermined number of pulses to said pulse motor for each scanning cycle and sending a synchronization signal for each scanning cycle in the transmission mode, said synchronization signal being sent in the period that the pulse motor is in a stop condition between the end of the scanning cycle and the beginning of the following scanning cycle, means for changing the operational mode of the device between either a local mode, a transmission mode or a receiving mode, wherein said control circuit is initiated either by receiving a synchronization signal when the device is in the receiving mode or by the insertion of an original paper when the device is in the transmission mode, and means for moving said printing paper and an original paper by a predetermined length at the end of each scanning cycle for sub-scanning the paper.

2. A facsimile transmitter-receiver system according to claim 1, wherein said means for moving printing paper and an original paper includes a plurality of magnet means for moving only the printing paper in the receiving mode and only the original paper in the transmission mode.

3. A facsimile transmitter-receiver system according to claim 1, wherein said read head comprises an optical fiber assembly having at least one thick emission fiber and a thin receiving fiber, a lamp positioned at the one end of said emission fiber, and a photoelectric converter positioned at the same end of said receiving fiber.

4. A facsimile transmitter-receiver system according to claim 1, wherein said control circuit comprises a clock pulse oscillator, a counter for receiving the output pulses of the clock pulse oscillator, and wherein the content of said counter controls the operation of said pulse motor, and the content of said counter is cleared to zero by the synchronization signal received at the start of each scanning cycle in the receiving mode, whereby the facsimile system in the receiving mode is synchronized with the corresponding facsimile system in the transmission mode.

* * * * *